United States Patent
Vecchiotti et al.

(10) Patent No.: US 9,842,446 B2
(45) Date of Patent: Dec. 12, 2017

(54) SYSTEMS AND METHODS FOR LOCK ACCESS MANAGEMENT USING WIRELESS SIGNALS

(71) Applicant: Onity Inc., Duluth, GA (US)

(72) Inventors: Alberto Vecchiotti, Atlanta, GA (US); Greg Berry, Alpharetta, GA (US)

(73) Assignee: ONITY INC., Salem, OR (US)

( * ) Notice: Subject to any disclaimer, the term of this patent is extended or adjusted under 35 U.S.C. 154(b) by 0 days.

(21) Appl. No.: 14/422,513

(22) PCT Filed: Aug. 14, 2013

(86) PCT No.: PCT/US2013/054852
§ 371 (c)(1),
(2) Date: Feb. 19, 2015

(87) PCT Pub. No.: WO2014/031399
PCT Pub. Date: Feb. 27, 2014

(65) Prior Publication Data
US 2015/0235496 A1  Aug. 20, 2015

Related U.S. Application Data

(60) Provisional application No. 61/691,520, filed on Aug. 21, 2012.

(51) Int. Cl.
*G07C 9/00* (2006.01)
*H04W 84/12* (2009.01)

(52) U.S. Cl.
CPC ..... *G07C 9/00309* (2013.01); *G07C 9/00007* (2013.01); *G07C 9/00904* (2013.01); *G07C 2009/00769* (2013.01); *H04W 84/12* (2013.01)

(58) Field of Classification Search
CPC ............ G07C 9/00007; G07C 9/00015; G07C 9/00031; G07C 9/00103; G07C 9/00126;
(Continued)

(56) References Cited

U.S. PATENT DOCUMENTS 7,706,778 B2  4/2010 Lowe
7,796,012 B2  9/2010 Gerstenkorn
(Continued)

FOREIGN PATENT DOCUMENTS

AU  2006343377 A1  11/2007
AU  2010214013 A1  8/2011
(Continued)

OTHER PUBLICATIONS

International Search Report and Written Opinion for application PCT/US2013/054852, dated Oct. 30, 2013, 10 pages.

*Primary Examiner* — Andrew Bee
(74) *Attorney, Agent, or Firm* — Cantor Colburn LLP

(57) ABSTRACT

A system for access management is disclosed. 100 A server (100) can receive a request for access to a locking device (140) from a mobile device (110). The server (100) can transmit access credentials to the mobile device (110). The mobile device (110) can transmit, via wireless signal, the access credentials and a lock command for the locking device (140) to a wireless access point (130) capable of communicating with the locking device (140). The wireless access point (130) can transmit the lock command to the locking device (140).

12 Claims, 3 Drawing Sheets

(58) Field of Classification Search
CPC ............ G07C 9/00174; G07C 9/00309; G07C 9/00857; G07C 9/00896; G07C 9/00904; H04W 12/00; H04W 12/08
See application file for complete search history.

(56) References Cited

U.S. PATENT DOCUMENTS

| | | | |
|---|---|---|---|
| 8,040,216 | B2 | 10/2011 | Jordan et al. |
| 8,078,146 | B2 | 12/2011 | Jayappa et al. |
| 8,120,459 | B2 | 2/2012 | Kwak |
| 8,150,374 | B2 | 4/2012 | Lowe |
| 2008/0211620 | A1 | 9/2008 | Willgert |
| 2009/0299777 | A1 | 12/2009 | Silberman |
| 2010/0201482 | A1 | 8/2010 | Robertson et al. |
| 2010/0201536 | A1 | 8/2010 | Robertson et al. |
| 2010/0306549 | A1 | 12/2010 | Ullmann |
| 2011/0165836 | A1 | 7/2011 | Dixon et al. |
| 2011/0187493 | A1 | 8/2011 | Elfstrom et al. |
| 2011/0311052 | A1 | 12/2011 | Myers et al. |
| 2012/0010923 | A1* | 1/2012 | Yarmolich ............ G06Q 20/10 705/7.32 |
| 2012/0068818 | A1 | 3/2012 | Mizon |
| 2012/0075057 | A1 | 3/2012 | Fyke et al. |
| 2012/0075059 | A1 | 3/2012 | Fyke et al. |
| 2013/0249670 | A1* | 9/2013 | Lee ................ G08C 19/00 340/5.61 |
| 2014/0025468 | A1* | 1/2014 | Grossman .......... G06Q 30/0207 705/14.26 |

FOREIGN PATENT DOCUMENTS

| | | |
|---|---|---|
| AU | 2010230205 A1 | 11/2011 |
| AU | 2010271246 A1 | 3/2012 |
| CN | 101161968 A | 4/2008 |
| CN | 201725378 U | 1/2011 |
| CN | 201865526 U | 6/2011 |
| CN | 102155121 A | 8/2011 |
| CN | 201955830 U | 8/2011 |
| DE | 102010044414 A1 | 3/2012 |
| EP | 1806703 A2 | 7/2007 |
| EP | 1998292 A2 | 12/2008 |
| EP | 2237234 A1 | 10/2010 |
| EP | 2355050 A2 | 8/2011 |
| EP | 2442282 A1 | 4/2012 |
| KR | 20030011477 A | 2/2003 |
| KR | 20030042479 A | 6/2003 |
| KR | 20030050583 A | 6/2003 |
| KR | 20040096466 A | 11/2004 |
| KR | 20070001477 A | 1/2007 |
| KR | 20070005861 A | 1/2007 |
| KR | 20110023218 A | 3/2011 |
| KR | 20110090635 A | 8/2011 |
| NL | 1033539 C2 | 9/2008 |
| WO | 2007130006 A2 | 11/2007 |
| WO | 2009094683 A1 | 8/2009 |
| WO | 2010093499 A2 | 8/2010 |
| WO | 2010112586 A1 | 10/2010 |
| WO | 2011006142 A1 | 1/2011 |
| WO | 2011159921 A1 | 12/2011 |
| WO | 2012037692 A1 | 3/2012 |
| WO | 2012077993 A2 | 6/2012 |

\* cited by examiner

SYSTEMS AND METHODS FOR LOCK ACCESS MANAGEMENT USING WIRELESS SIGNALS

FIELD

The systems and methods pertain to access control management. More particularly, the systems and methods pertain to an access control system using wireless signals and access points.

DESCRIPTION OF THE PRIOR ART

Many buildings require variable access to locks within the building. For example, hotels may wish to grant access to a particular room to a particular guest for a definite period of time. Traditionally, such businesses would provide keys, either physical or electronic, to the guest upon their arrival at the premises when the guest would "check in." However, the check in process could be inconvenient for the guest and the hotel, as employees would have to personally interact with the guest and provide a key.

Modern access management solutions can allow a user, for example, a user that requires variable access, to be granted access to particular locks without a check in procedure. However, such solutions may require special hardware owned by or provided to the user, such as proprietary electronic keys.

Many users own mobile devices, such as cell phones, tablet computers, etc., which can be used for communicating with locking devices via, for example, wireless signals. However, such communications can be problematic due to the amount of power required by the locking device, which are usually battery operated, to receive such signals.

Accordingly, there is a need for access control systems that can utilize communication means available to most mobile devices, while allowing the locking device to minimize power usage.

SUMMARY

According to embodiments, a system for managing access to locking devices is disclosed. In certain embodiments, the system comprises a server configured to manage and communicate with mobile devices. The server is further configured to receive access requests from the mobile device, validate user and/or mobile device credentials from the mobile devices, and transfer access credentials to the mobile devices.

In additional embodiments, the system comprises a mobile device configured to run an access application and transmit a wireless signal. The mobile device can be additionally be configured to transmit locking device access requests to an access management server, communicate user and/or mobile credentials to the access management server, and receive access credentials from the access management server. The mobile device can be further configured to communicate with a wireless access point via wireless signals and transmit access credentials to the wireless access point.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DESCRIPTION OF THE EMBODIMENTS

With reference to the various drawing figures in which identical elements are numbered identically throughout, a description of the embodiments is provided.

Figure 1:
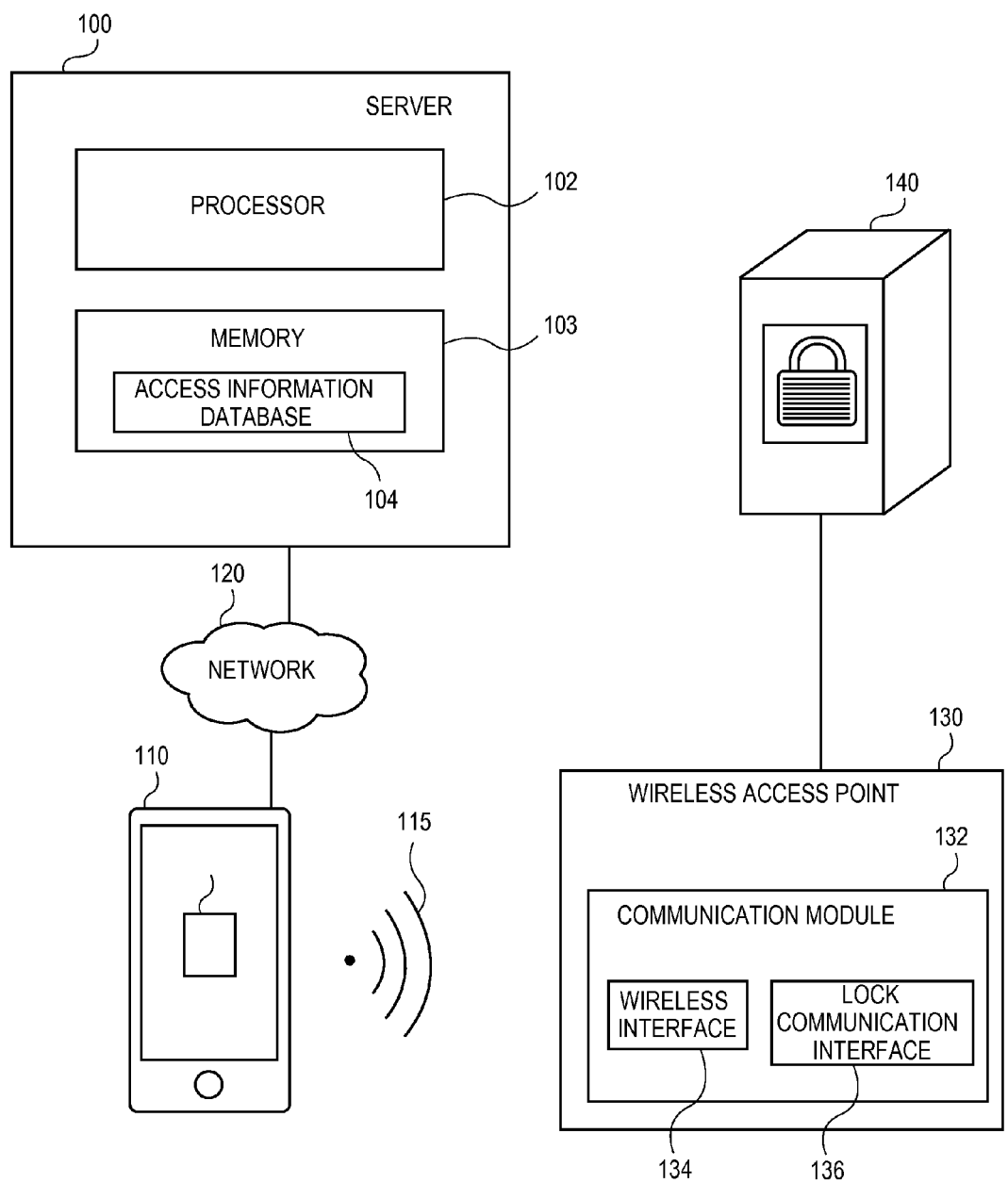
FIG. 1 illustrates an exemplary access management environment, consistent with certain disclosed embodiments.

FIG. 1 is a diagram depicting an exemplary access management environment, consistent with certain disclosed embodiments. The environment comprises an access management server 100 connected to mobile device 110 via network 120. In embodiments, access management server 100 can be a computing device, while, in further embodiments, access management server 100 can represent a service, such as a cloud service, an application, such as a website application, or a combination thereof. Access management server 100 can communicate with mobile device 110 via network 120. Network 120 can be, for example, a cellular network including one or more cell sites or base stations, or, in some embodiments, network 120 can be a global or wide area computer network or a combination of cellular and computer networks.

Access management server 100 can represent any type of computing device capable of managing locking device access information and communicating with mobile device 110 via network 120. In embodiments, access management server 100 can represent a single computing device, while, in further embodiments, access management server 100 can represent a plurality of computing devices interconnected via one or more communication networks.

In embodiments, access management server 100 can include a processor 102 communicating with a memory 103, such as electronic random access memory, or other forms of transitory or non-transitory computer readable storage mediums. Memory 103 can include an access information database 104. Access information database 104 can be utilized to store, for example, locking device identifiers, approved user credentials associated with a locking device identifier, access credentials associated with a locking device identifier, etc. User credentials can include, but are not limited to, a user name, a user password, a security code, a locking device identifier, and mobile device credentials, such as an International Mobile Subscriber Identity (IMSI) number associated with the subscriber identity module (SIM) card of mobile device 110. Such data can be added to access data record manually by an administrator or automatically after a registration and/or validation process for a user.

Processor 102 can execute control logic and perform data processing to perform the functions and techniques as discussed herein. For example, processor 102 can process requests for access to a locking device from mobile device 110, validate user credentials received from mobile device 110, determine locking device identifier information associated with the user credentials, and transfer access credentials to mobile device 110. In embodiments, access credentials can comprise, for example, passwords, security codes, digital certificates, etc. In further embodiments, access credentials can comprise computer readable and/or executable files that can be transferred to and stored on mobile device 110.

In embodiments, access management server 100 can utilize cryptographic protocols to prevent unauthorized access to access management server 100 and to ensure that mobile device 110 is authorized to receive access credentials. Additionally, in embodiments, communications and information exchanged between access management server 100 and mobile device 110 can be encrypted and decrypted using one or more encryption methods.

Mobile device 110 can represent any type of mobile device capable of communicating with access management server 100 and transmitting a wireless signal to wireless access point 130. While mobile device 110 is depicted in FIG. 1 as a single device, such depiction is for illustrative purposes only, and mobile device 110 can represent a single mobile device or a plurality of mobile devices capable of communicating with access management server 100 and transmitting wireless signals.

In embodiments, a user of mobile device 110 may be required to install an access application on mobile device 110 before mobile device 110 can transmit user credentials to and receive access credentials from access management server 100. Once the user initiates the installation of the access application, mobile device 110 can download the access application from access management server 100 or from a separate content server. Upon receipt of the access application, mobile device can install the application.

After mobile device 110 has obtained the access credentials from access management server, mobile device 110 can transmit a wireless signal to search for and connect to wireless access point 130. For example, mobile device 110 can comprise a Wi-Fi® certified transmitting device, and can transmit a Wi-Fi® signal to search for a Wi-Fi® access point.

Wireless access point 130 can include one or more devices capable of receiving wireless signals from mobile device 110 and capable of communicating with locking device 140. For example, wireless access point 130 can include a wireless router capable of functioning in a wireless local area network (WLAN) and connected to a computing device capable of communicating with locking device 140 over a wired or wireless connection.

Wireless access point 130 can further include a communication module 132. Communication module 132 can comprise a wireless interface 134. In embodiments, wireless interface 134 is capable of transmitting and receiving wireless signals, such as Wi-Fi® signals, from mobile device 110. Communication module 132 can further comprise lock communication interface 136. In embodiments, lock communication interface 136 is capable of communicating with locking device 140.

In some implementations, if mobile device 110 is unable to find wireless access point 130, using one or more wireless signals, mobile device 110 will not connect to wireless access point 130 and mobile device 110 can continue to transmit a wireless signal searching for wireless access point 130. Once mobile device 110 finds and connects to wireless access point 130, mobile device 110 can, for example, verify access point credentials of wireless access point 130. Access point credentials can include, but are not limited to, security codes, passwords, access point names, verified responses, digital certificates, etc. If wireless access point 130 does not have the correct credentials or does not respond to a request for access point credentials, mobile device 110 can continue to interact with the wireless access point, but may be unable to submit unlock requests. In some embodiments, mobile device 110 can continue to search for additional wireless access points, or can prompt the user that the wireless access point cannot be verified.

If mobile device 110 connects to wireless access point 130 and mobile device 110 is able to verify the access point credentials of access point 130, mobile device can, in embodiments, prompt the user that a verified connection has been made. In further embodiments, mobile device 110 may not inform the user that a verified connection was made.

In embodiments, locking device 140 can comprise one or more locking devices capable of fastening and/or controlling access, and locking device 140 can include mechanical and electrical components. Additionally, locking device 140 can communicate with wireless access point 130, for example, via a local area network. In some embodiments, locking device 140 can operate in a "wake up" mode and a "sleep" mode to conserve power. For example, locking device 140 can maintain a locked state and utilize little to no power while in "sleep" mode. Further, during "sleep" mode, locking device 140 may not be able to communicate with access point 130.

Locking device 140 can receive a "wake up" signal from a user, such as the user of mobile device 110. Examples of "wake up" signals include, but are not limited to, the user pressing a "wake up" button on locking device 140, the user turning a handle connected to locking device 140, and locking device 140 sensing movement via a proximity sensor. Upon receipt of a "wake up" signal, locking device 140 can enter "wake up" mode. During "wake up" mode, locking device 140 can communicate with wireless access point 130. In some embodiments, locking device 140 may not enter a "sleep" mode and may consistently persist in an active or "wake up" mode.

In some embodiments, the user of mobile device 110 can enter an open command into mobile device 110 using the access application. In some embodiments, the user may be required to enter user credentials before the open command can be processed. In additional embodiments, a user may be granted access to multiple locks, and the user may be required to specify which lock to open before the open command can be processed.

Mobile device 110 can send the open command via wireless signal 115 to wireless access point 130. Wireless access point 130 can, for example, process the command, determine which lock the command is associated with, verify user credentials, and/or verify access credentials. Then, wireless access point 130 can send an open command to locking device 140 via lock communication interface 136.

If locking device 140 is in "sleep" mode, locking device 140 may not receive the open command from wireless access point 130. Conversely, if locking device 140 is in "wake up" mode, locking device 140 can process the open command and open the lock.

It should be appreciated that the environment depicted in FIG. 1 is merely exemplary and can include various combinations and types of components and processes. For example, in certain embodiments, locking device 140 can further communicate with wireless access point 130 to confirm that an open command has been successfully processed. Wireless access point 130 can then transmit a wireless single, via wireless interface 134, to mobile device 110 confirming the success of the open command.

Figure 2:
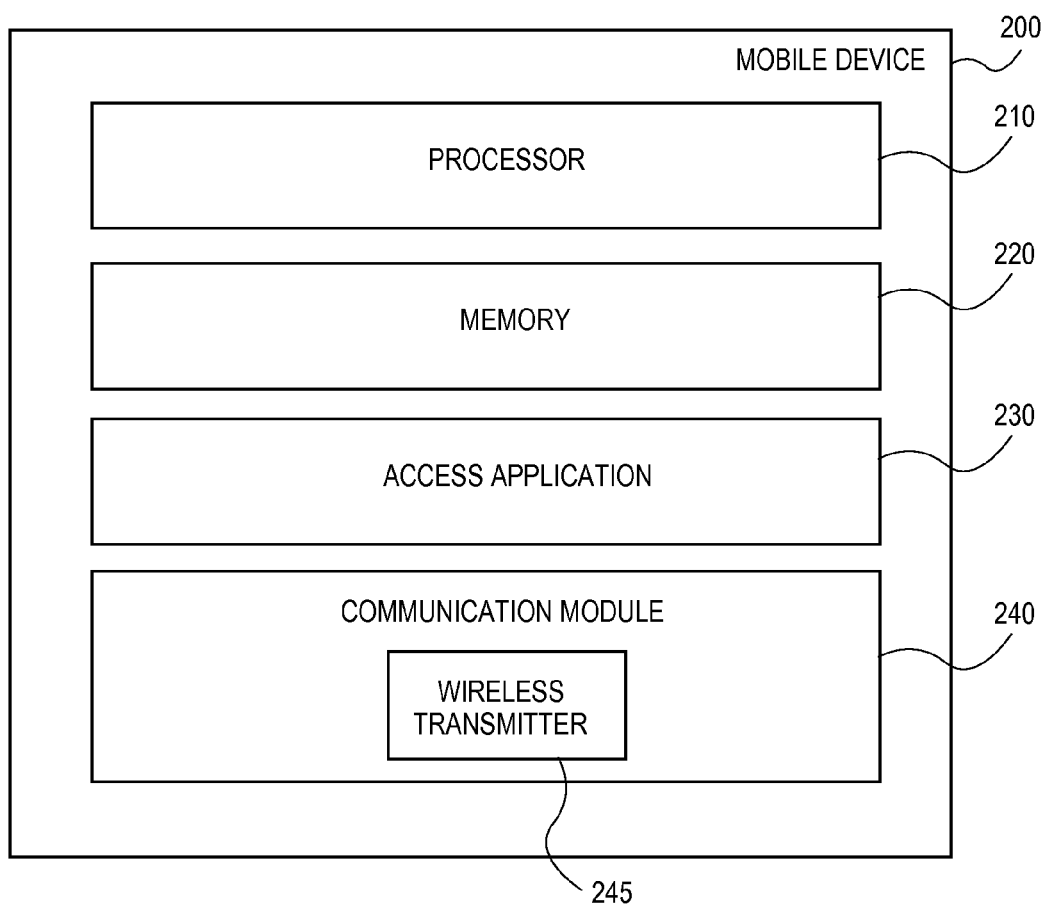
FIG. 2 is a block diagram of an exemplary mobile device, consistent with certain disclosed embodiments.

Referring to FIG. 2, depicted is an exemplary mobile device 200 and components thereof. It should be appreciated that FIG. 2 represents a generalized schematic illustration and that other components and/or entities can be added or existing components and/or entities can be removed or modified.

Mobile device 200 can include a processor 210 communicating with a memory 220, such as electronic random access memory, or other forms of transitory or non-transitory computer readable storage mediums. Processor 210 can further communicate with communication module 240, which in turn can communicate with a wide area network, such as various public or private networks, telecommunications networks, and/or via wireless signals. More particularly, the wide area network can connect mobile device 200 to one or more access management servers, such as access management server 100, as discussed with respect to FIG. 1, and/or other components. Additionally, communication module 240 can include wireless transmitter 245 and can communicate with one or more wireless access points, such as wireless access point 130, as discussed with respect to FIG. 1, via wireless transmitter 245.

Processor 210 can execute control logic and perform data processing to perform functions and techniques as discussed herein. For example, processor 210 can install and/or execute access application 230. Further, access application 230 can be configured to perform operations including, but not limited to, transmitting lock command requests to an access management server, receiving access credentials from the access management server, searching for a wireless access point, confirming credentials of the wireless access point, transmitting user and/or access credentials to the wireless access point, and/or transmitting lock commands to the wireless access point. Lock commands can include, but are not limited to, opening and locking a specified locking device.

Figure 3:
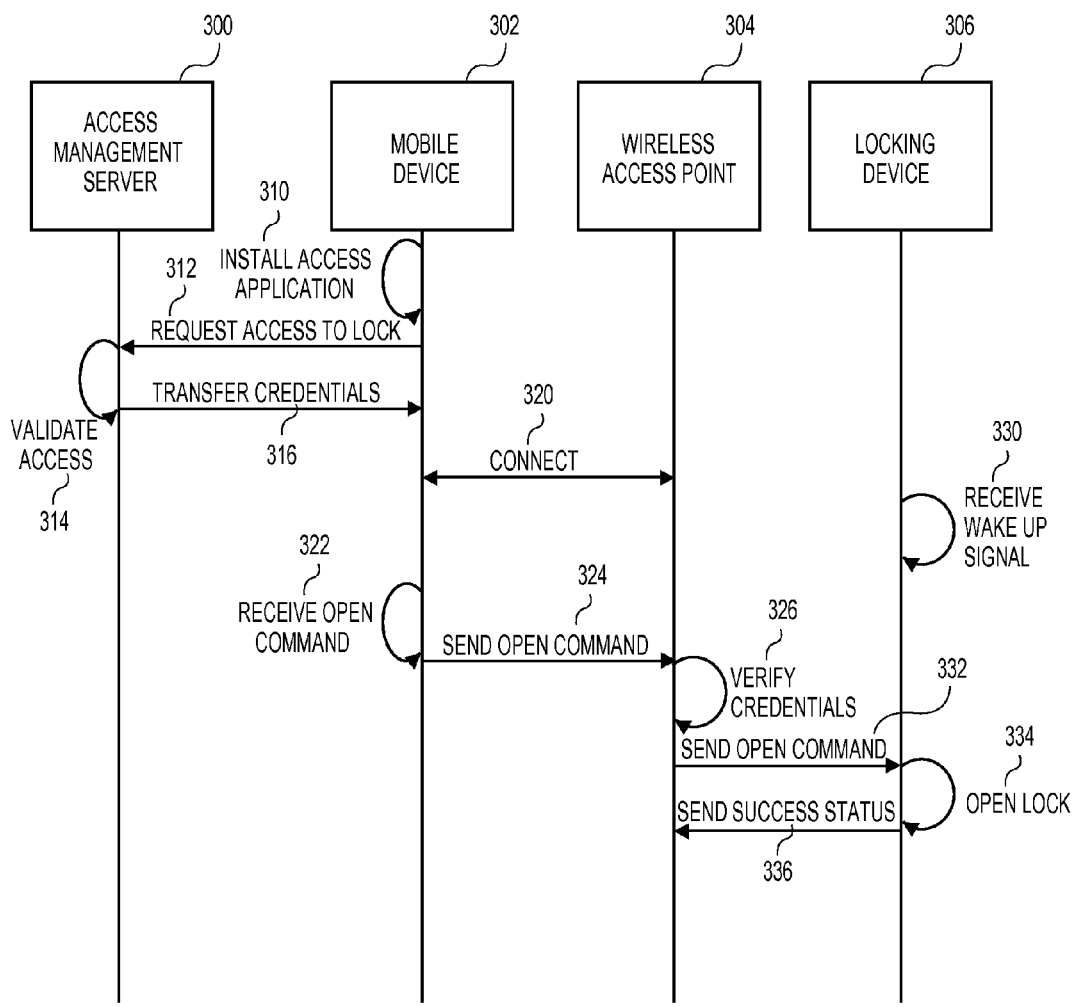
FIG. 3 is a flow diagram depicting managing access to a locking device, consistent with certain disclosed embodiments.

Referring to FIG. 3, depicted is a flowchart detailing embodiments as described herein. More particularly, the flowchart details communications and interactions among an access management server 300, a mobile device 302, a wireless access point 304, and a locking device 306. Access management server 300 can represent a computing device capable of communicating with mobile devices, similar to access management server 100 depicted in FIG. 1. Mobile device 302 can represent a mobile device capable of communicating with an access management server and a wireless access point, similar to mobile device 110 depicted in FIG. 1. Wireless access point 304 can represent one or more devices capable of receiving wireless signals from mobile devices and communicating with locking devices, similar to wireless access point 130 depicted in FIG. 1. Locking device 306 can represent a device capable of locking and/or controlling access and capable of communicating with a wireless access point, similar to locking device 140 depicted in FIG. 1. It should be appreciated that the flowchart of FIG. 3 is merely exemplary and can comprise more or fewer functionalities.

Processing can begin when a user is associated with and given access to locking device 306, for example, by an administrator using access management server 300. The user can further be associated with user credentials, such as mobile device credentials of mobile device 302.

The user can select to install an access application to mobile device 302 (310). The user can then, in embodiments, input user credentials, such as a user name, and select to access a locking device and/or perform a lock command, such as an open command, and transmit the request to access management server 300 (312). In some embodiments, mobile device 302 can further transmit the user credentials to access management server 300. Access management server can validate the request and/or the user credentials (314), determine that the user and/or mobile device is associated with locking device 306, and transfer access credentials, such as a digital certificate, for locking device 306 to mobile device 302 (316).

Mobile device 302 can search for a wireless access point in communication with locking device 306, such as wireless access point 304. Upon finding and connecting to wireless access point 304 (320), mobile device can verify access point credentials of wireless access point 304 to ensure wireless access point 304 is connected to locking device 306 and is authorized to perform lock commands. In some embodiments, mobile device 302 can notify the user that a connection has been established. The user can, in some embodiments, input and mobile device 302 can receive a lock command, such as an open command (322). In other embodiments, the user may have already entered an open command, as described above. Mobile device 302 can transmit the open command and access and/or user credentials to wireless access point 304 (324). Wireless access point can validate the access and/or user credentials (326).

Wireless access point can send an open command to locking device 306 (332). If locking device 306 is in a "sleep" mode, locking device 306 may not receive the open command. In some embodiments, the wireless access point 304 can continuously attempt to transmit the open command until an instruction is receive to stop, or wireless access point 304 can attempt to transfer the command a set number of times or for a set period of time. Additionally, wireless access point 304 can transmit a message to mobile device 302 via wireless signal that the open command failed.

However, if the user activates or "wakes up" locking device 306 (330), locking device 306 can receive the open command and perform operations to open an attached lock (334). In embodiments, locking device 306 can transmit a successfully opened status to wireless access point 304 (336). In further embodiments, wireless access point 304 can send the success status to mobile device 302 via wireless signal, and mobile device 302 can display an indication of a successfully opened status to the user.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:
1. A mobile device comprising:
a wireless transmitter;
a processor, connected to the wireless transmitter; and
a memory system comprising one or more computer-readable media, wherein the computer-readable media contain instructions that, when executed by the processor, cause the processor to perform operations comprising:
transmitting a request to access a locking device to an access management server, the request including an indication that the mobile
device is associated with the locking device;
receiving access credentials from the access management server;
searching, via wireless signal using the wireless transmitter, for a wireless access point capable of communicating with the locking device;
verifying access point credentials of the wireless access point to confirm the wireless access point is connected to the locking device and is authorized to command the locking device;
transferring, via wireless signal using the wireless transmitter, a lock command and the access credentials to the wireless access point configured to communicate with the locking device;
the wireless access point being separate from the locking device and located remotely from the locking device, the wireless access point including a wireless interface configured to communicate with the mobile device and a lock communication interface configured to communicate with the locking device.

2. The mobile device of claim 1, the operations further comprising transferring user credentials to the access management server.

3. The mobile device of claim 2, wherein the user credentials are mobile device credentials of the mobile device.

4. The mobile device of claim 2, the operations further comprising:
requesting the user credentials from a user of the mobile device; and
receiving the user credentials from the user of the mobile device.

5. The mobile device of claim 2, the operations further comprising transferring the user credentials to the wireless access point.

6. The mobile device of claim 1, wherein transmitting the request to access the locking device is in response to receiving a request from a user of the mobile device to open the locking device.

7. The mobile device of claim 1, further comprising a wireless receiver; the operations further comprising:
receiving a confirmation of access from the wireless access point; and displaying an indication of the confirmation of access.

8. A wireless access point device capable of communicating with a locking device comprising:
a wireless receiver configured to receive wireless signals from a mobile device;
a processor connected to the wireless receiver; and
a memory system comprising one or more computer-readable media, wherein the computer-readable media contain instructions that, when executed by the processor, cause the processor to perform operations comprising:
receiving a request from the mobile device for a verification of access point credentials of the wireless access point to confirm the wireless access point is connected to the locking device and is authorized to command the locking device;
receiving access credentials and a lock command for a locking device from the mobile device via wireless signal;
verifying the access credentials; and
transmitting the lock command to the locking device;
the wireless access point being separate from the locking device and located remotely from the locking device, the wireless access point including a lock communication interface configured to communicate with the locking device.

9. The wireless access point device of claim 8, the operations further comprising receiving user credentials from the mobile device.

10. The wireless access point device of claim 9, wherein the user credentials comprise mobile device credentials of the mobile device.

11. The wireless access point device of claim 8, further comprising a wireless transmitter;
the operations further comprising transmitting a confirmation of access to the mobile device.

12. A system for controlling access comprising:
a server configured to communicate with a mobile device, the server comprising
a processor and
a memory system comprising one or more computer-readable media, wherein the computer-readable media contain instructions that, when executed by the processor, cause the processor to perform operations comprising:
receiving a request, at the server, to access a locking device from the mobile device;
validating the request at the server and determining that the mobile device is associated with the locking device; and
transferring access credentials to the mobile device upon validating the request, wherein the mobile device is configured to transfer the access credentials via a wireless signal to a wireless access point capable of communicating with the locking device;
the wireless access point being separate from the locking device and located remotely from the locking device, the wireless access point including a wireless interface configured to communicate with the mobile device and a lock communication interface configured to communicate with the locking device;
the wireless access point verifying the access credentials, the wireless access point sending a lock command to the lock communication interface in response to verifying the access credentials;
wherein the mobile device verifies that wireless access point is connected to the locking device and is authorized to perform lock commands prior to sending the lock command.

* * * * *